United States Patent
Becker et al.

(10) Patent No.: US 11,781,034 B2
(45) Date of Patent: Oct. 10, 2023

(54) LOW VOC WATER BORNE COATING COMPOSITIONS WITH IMPROVED APPLICATION PROPERTIES

(71) Applicant: AXALTA COATING SYSTEMS IP CO., LLC, Wilmington, DE (US)

(72) Inventors: Wiebke Becker, Essen (DE); Carmen Flosbach, Wuppertal (DE)

(73) Assignee: AXALTA COATING SYSTEMS IP CO., LLC, Wilmington, DE (US)

( * ) Notice: Subject to any disclaimer, the term of this patent is extended or adjusted under 35 U.S.C. 154(b) by 439 days.

(21) Appl. No.: 16/902,883

(22) Filed: Jun. 16, 2020

(65) Prior Publication Data

US 2020/0407586 A1 Dec. 31, 2020

Related U.S. Application Data

(60) Provisional application No. 62/867,533, filed on Jun. 27, 2019.

(51) Int. Cl.

| | | |
|---|---|---|
| *C09D 133/08* | (2006.01) | |
| *C08F 220/18* | (2006.01) | |
| *B05D 7/00* | (2006.01) | |
| *C08F 2/00* | (2006.01) | |
| *C08F 212/08* | (2006.01) | |
| *C08F 220/06* | (2006.01) | |
| *C08F 220/20* | (2006.01) | |
| *C08K 5/00* | (2006.01) | |
| *C08L 75/06* | (2006.01) | |
| *C09D 175/06* | (2006.01) | |
| *C08G 18/28* | (2006.01) | |
| *C08G 18/73* | (2006.01) | |
| *C08G 18/75* | (2006.01) | |

(52) U.S. Cl.
CPC ............ *C09D 133/08* (2013.01); *B05D 7/57* (2013.01); *C08F 2/001* (2013.01); *C08F 212/08* (2013.01); *C08F 220/06* (2013.01); *C08F 220/1804* (2020.02); *C08F 220/1811* (2020.02); *C08F 220/20* (2013.01); *C08K 5/0025* (2013.01); *C08L 75/06* (2013.01); *C09D 175/06* (2013.01); *C08G 18/281* (2013.01); *C08G 18/73* (2013.01); *C08G 18/755* (2013.01); *C08G 18/758* (2013.01)

(58) Field of Classification Search
CPC .. C09D 175/06; C09D 175/14; C09D 133/08; C09D 7/65; C08L 2205/05; C08L 75/06; C08K 5/0025; C08G 18/792; C08G 18/758; C08G 18/755; C08G 18/73; C08G 18/6254; C08G 18/6229; C08G 18/4615; C08G 18/4613; C08G 18/4219; C08G 18/4063; C08G 18/281; C08G 18/0823; C08F 220/20; C08F 212/08; C08F 2/001; B05D 7/57

See application file for complete search history.

(56) References Cited

U.S. PATENT DOCUMENTS

| | | |
|---|---|---|
| 5,369,147 A | 11/1994 | Mushovic |
| 6,335,381 B1 | 1/2002 | Hovestadt et al. |
| 6,534,588 B1 | 3/2003 | Löcken et al. |
| 7,007,711 B1 | 3/2006 | Klinksiek et al. |
| 7,034,067 B1 | 4/2006 | Klinksiek et al. |
| 10,233,353 B2 * | 3/2019 | Flosbach .............. C08G 18/758 |
| 2004/0167252 A1 | 8/2004 | Melchiors et al. |
| 2006/0069202 A1 | 3/2006 | Becker et al. |
| 2015/0315414 A1 * | 11/2015 | Flosbach ................ B05D 7/532 427/470 |

FOREIGN PATENT DOCUMENTS

| | | |
|---|---|---|
| CN | 1600827 A | 3/2005 |
| CN | 1939604 A | 4/2007 |
| CN | 105820306 A | 8/2016 |
| CN | 105940031 A | 9/2016 |
| CN | 107428888 A | 12/2017 |
| CN | 108424698 A | 8/2018 |
| CN | 109476806 A | 3/2019 |
| JP | 02166464 A | 6/1990 |
| JP | 2003211085 A | 7/2003 |
| WO | 9942530 A1 | 8/1999 |
| WO | 03099892 A1 | 12/2003 |
| WO | 2009117330 A1 | 9/2009 |
| WO | 2013169871 A1 | 11/2013 |
| WO | 2014078514 A1 | 5/2014 |
| WO | WO-2014078514 A1 * | 5/2014 ............. B05D 1/007 |

* cited by examiner

*Primary Examiner* — Sanza L. McClendon
(74) *Attorney, Agent, or Firm* — Lorenz & Kopf, LLP

(57) ABSTRACT

This description relates to low VOC water borne coating compositions with improved application properties based on a binder mixture comprising an urethanized polyester and an acrylic two-step polymer. This description further relates to the use of the low VOC water borne coating compositions for forming a coating, preferably for forming a clear coat, and more preferably for forming a clear coat in refinishing applications. Moreover, this description also relates to a method of forming a multilayer coating comprising a step of forming a coating layer by using the low VOC water borne coating composition.

20 Claims, No Drawings

LOW VOC WATER BORNE COATING COMPOSITIONS WITH IMPROVED APPLICATION PROPERTIES

This application claims the benefit of U.S. Provisional Application No. 62/867,533, filed Jun. 27, 2019, the contents of which are incorporated herein by reference.

TECHNICAL FIELD

This description relates to low VOC (volatile organic compound) water borne coating compositions with improved application properties based on a binder mixture comprising an urethanized polyester and an acrylic two-step polymer. The description further relates to the use of the low VOC water borne coating compositions for forming a coating, preferably for forming a clear coat, and more preferably for forming a clear coat in refinishing applications. Moreover, the description also relates to a method of forming a multilayer coating comprising a step of forming a coating layer by using the low VOC water borne coating composition.

BACKGROUND

For ecological reasons water based paints are increasingly used in automotive and industrial coatings. The aim of this is to keep the proportion of organic co-solvents in the water based paints as small as possible. The water-dilutable binders, for example, acrylate copolymers, used in water paints are usually manufactured in organic solvents in a one or several step process. The solvents are at least partly distilled off at a later stage. Such coating compositions are for instance described in WO 2006/026671 A1 and WO 2006/039430 A1 which focus on acrylates as binders and in particular on the compatibility of the acrylate binders with the crosslinker used, i.e. hydrophobic polyisocyanates. In these documents particular interest is given to the optical properties of the obtained coating as well as the mechanical properties thereof.

However, in particular in the field of refinishing applications, apart from the optical and mechanical properties of the obtained coating, it is also important that the application properties of the coating composition, such as spraying properties, wetting, flow and rewetting, are acceptable as this may ensure that the quality of the coating obtained from a given coating composition is always similar independently of the particular spraying skills of the applicator. Currently, achieving acceptable performance for these properties requires the presence of considerable amounts, such as up to about 3.5 lb/gal (420 g/l), of non-aqueous solvents, i.e. volatile organic compounds (VOC), in the coating composition. The need of such high amounts of VOC, however, is in contrast to the improvements achieved as regards reducing VOC in the binder component.

Hence, there is a continued need for a coating composition wherein the overall VOC content is further reduced and which, at the same time, may be used for the preparation of coatings having excellent physical properties, such as appearance and mechanical properties, and which also have excellent application properties, such as spraying properties, wetting, flow and rewetting.

BRIEF SUMMARY

This description relates to a water-borne coating composition comprising A) a binder, and B) a crosslinker, wherein the binder comprises A1) a urethanized polyester and A2) a (meth)acrylic copolymer.

This description further relates to the use of the aqueous composition for forming a coating, preferably a clear coat, and in particular for forming a clear coat in refinishing applications.

This description further relates to a process which comprises applying a multi-layer coating on a substrate using the aqueous coating composition and curing the coating.

Further embodiments are described in the following detailed description and in the annexed claims.

DETAILED DESCRIPTION

The features and advantages of the present description will be more readily understood, by those of ordinary skill in the art, from reading the following detailed description. It is to be appreciated those certain features of this description, which are, for clarity, described above and below in the context of separate embodiments, may also be provided in combination in a single embodiment. Conversely, various features of this description that are, for brevity, described in the context of a single embodiment, may also be provided separately or in any sub-combination. In addition, references in the singular may also include the plural (for example, "a" and "an" may refer to one, or one or more) unless the context specifically states otherwise.

The use of numerical values in the various ranges specified in this application, unless expressly indicated otherwise, are stated as approximations as though the minimum and maximum values within the stated ranges were both preceded by the word "about." In this manner, slight variations above and below the stated ranges can be used to achieve substantially the same results as values within the ranges. Also, the disclosure of these ranges is intended as a continuous range including every value between the minimum and maximum values.

All patents, patent applications and publications referred to herein are incorporated by reference in their entirety.

In the description and the claims a distinction is made between "solids", "resin solids", "binder solids" and "crosslinker solids" of the aqueous coating composition. The solids of the aqueous coating composition comprise any non-volatile constituents including the resin solids and any further components making a solids contribution like, for example, pigments, fillers (extenders) and non-volatile additives. The resin solids itself includes the binder solids (solids contributions of the binders) and of the cross-linker solids (solids contributions of the cross-linkers).

The term (meth)acrylic as used here and hereinafter should be taken to mean methacrylic and/or acrylic.

All molecular weights referred to herein are determined by GPC (gel permeation chromatography) using polystyrene as the standard.

Surprisingly, it has been found that the aqueous coating composition of this description can be used for the preparation of coatings having improved physical properties, such as appearance and mechanical properties, and which also have improved application properties, such as spraying properties, wetting, flow and rewetting. It has further been found that the coating composition of this description is particularly suitable as a clear coat coating composition. Hence, the aqueous coating composition of this description has improved application properties, such as spraying properties, wetting, flow and rewetting and in particular flow, without the need to increase the organic solvent content of the coating composition.

The water-borne coating composition comprises A) a binder, and B) a crosslinker. The binder A) comprises A1) a urethanized polyester and A2) a (meth)acrylic copolymer. Preferably, the urethanized polyester A1) as well as the (meth)acrylic copolymer A2) are hydroxy-functional.

The urethanized polyester A1) is preferably a hydroxyl-functional urethanized polyester. For example, the urethanized polyester A1) has a hydroxyl number of about 50 to about 250 mg KOH/g, preferably about 70 to about 200 mg KOH/g and a carboxyl number of about 10 to about 50 mg KOH/g, preferably about 10 to about 40 mg KOH/g. Its weight average molar mass may be, for example, about 5000 to about 50000, preferably about 5000 to about 10000.

The urethanized polyester A1) is for example an esterification product made of for example a polyurethane resin with a carboxyl number of about 50 to about 200 mg KOH/g and a weight average molar mass of, for example, about 3000 to about 9000, and a polyester polyol with a hydroxyl number of about 70 to about 300 mg KOH/g, a carboxyl number of, for example, 0 to about 30 mg KOH/g and a weight average molar mass of, for example, about 2000 to about 4000. The urethanized polyester A1) is typically free of free and blocked isocyanate groups (isocyanate groups blocked by monofunctional blocking agents as are conventionally used for permanently or reversibly blocking isocyanate, such as monoalcohols, ketoximes, phenols, lactams, CH-acidic compounds, pyrazoles, etc.

Polyurethane resins, such as for instance polyurethane resins with a carboxyl number of about 50 to about 200 mg KOH/g, can be produced, as is known to a person skilled in the art, by reacting polyisocyanates with hydroxycarboxylic acids and, optionally, polyols at a stoichiometric ratio of isocyanate groups and hydroxyl groups.

Linear polyurethane resins with terminal carboxyl groups corresponding to a carboxyl number of about 50 to about 200 mg KOH/g are preferred; especially preferred are linear polyurethane resins with terminal and lateral carboxyl groups corresponding to a carboxyl number of about 50 to about 200 mg KOH/g. Polyurethane resins of this type can be produced by reacting diisocyanates with monohydroxycarboxylic acids and diols or with monohydroxycarboxylic acids and dihydroxycarboxylic acids and, optionally, although less preferred, diols. Said addition reactions can be carried out in the absence or in the presence of an organic solvent (mixture) which is inert to isocyanate groups. Generally, the addition reactions are carried out at a temperature ranging from about 60 to about 100° C.

Examples of polyisocyanates which may be used to produce the carboxyl-functional polyurethane resins include polyisocyanates having two or more than two free isocyanate groups corresponding to a content of free isocyanate of, for example, from about 10 to about 50% by weight.

Examples of suitable polyisocyanates include diisocyanates, such as phenylene, toluylene, xylylene, naphthylene or diphenylmethane diisocyanate, 1,6-hexane diisocyanate, dicyclohexylmethane diisocyanate, isophorone diisocyanate, trimethylhexane diisocyanate, cyclohexane diisocyanate, cyclohexanedimethylene diisocyanate and tetramethylenexylylene diisocyanate.

Examples of polyisocyanates having more than two isocyanate groups comprise trisisocyanatononane and polyisocyanates derived from the diisocyanates stated in the preceding paragraph. Such examples comprise oligomers of the diisocyanates or isocyanurate, uretdione or biuret derivatives of the diisocyanates or isocyanate-functional adducts of the diisocyanates and compounds having at least three groups containing active hydrogen per molecule, in particular, polyols, polyamines and/or aminoalcohols, such as, for example, trimethylolpropane, glycerol, diethylene triamine and 1:1-adducts of dialkanolamines and cyclic carbonate.

Examples of hydroxycarboxylic acids which may be used to produce the carboxyl-functional polyurethane resins include monohydroxycarboxylic acids, such as glycolic acid (hydroxyacetic acid), malic acid, 12-hydroxystearic acid, 4-hydroxybenzoic acid, citric acid, or 1:1-adducts of monoepoxy compounds and dicarboxylic acids, for example, corresponding adducts of glycidyl ethers or glycidyl esters, such as glycidyl versatate with dicarboxylic acids, and polyhydroxycarboxylic acids, such as tartaric acid, dimethylolpropionic acid and dimethylolbutyric acid.

Examples of polyols which may be used to produce the carboxyl-functional polyurethane resins include diols, such as ethylene glycol, the isomeric propane- and butanediols, 1,5-pentanediol, 1,6-hexanediol, 1,10-decanediol, 1,12-dodecanediol, neopentyl glycol, butylethylpropanediol, trimethylhexane diol, diethylene glycol, triethylene glycol, tripropylene glycol, the isomeric cyclohexanediols, the isomeric cyclohexanedimethanols, hydrogenated bisphenols, tricyclodecanedimethanol, dimer fatty alcohol, bisphenol A, and polyols with more than two hydroxyl groups, such as glycerol, trimethylolpropane, trimethylolethane, pentaerythritol, dipentaerythritol, ditrimethylolpropane, sorbitol and mannitol.

Polyester polyols, for instance polyester polyols with a hydroxyl number of about 70 to about 300 mg KOH/g and a carboxyl number of, for example, 0 to about 30 mg KOH/g can be produced by polycondensation of polyols with polycarboxylic acids or with suitable polycarboxylic acid derivatives, such as, for example, corresponding esters or anhydrides. Hydroxycarboxylic acids, monoalcohols, monocarboxylic acids and/or epoxide compounds may, optionally, be included in the polyester synthesis. Polycondensation may be carried out by the conventional methods known to the skilled person, for example, in the presence of conventional esterification catalysts and at elevated temperatures of, for example, about 180 to about 250° C., for example, in the melt. Optionally, entrainers, such as, for example, xylene, may also be used.

Examples of polyols which may be used to produce polyester polyols, such as, for example, polyester polyols with a hydroxyl number of about 70 to about 300 mg KOH/g and a carboxyl number of, for example, 0 to about 30 mg KOH/g, are the same as those which have been previously mentioned as examples of polyols which may be used to produce the carboxyl-functional polyurethane resins.

Examples of polycarboxylic acids which may be used to produce polyester polyols, such as, for example, polyester polyols with a hydroxyl number of about 70 to about 300 mg KOH/g and a carboxyl number of, for example, 0 to about 30 mg KOH/g include dicarboxylic acids, such as phthalic acid, isophthalic acid, terephthalic acid, tetrahydrophthalic acid, hexahydrophthalic acid, 1,3- and 1,4-cyclohexane dicarboxylic acid, succinic acid, adipic acid, sebacic acid, azelaic acid, dodecanedioic acid, maleic acid, fumaric acid, dimer fatty acids, and polycarboxylic acids with more than two carboxyl groups, such as trimellitic acid and pyromellitic acid.

The polyester polyols, such as for example polyester polyols with a hydroxyl number of about 70 to about 300 mg KOH/g and a carboxyl number of, for example, 0 to about 30 mg KOH/g, may be linear, in which case they are polyesterdiols. However, branched polyester polyols, such as, for example, polyester polyols with a hydroxyl number of about 70 to about 300 mg KOH/g and a carboxyl number of, for example, 0 to about 30 mg KOH/g, are preferred.

The urethanized polyester binder can for instance be produced by esterifying a carboxyl-functional polyurethane with a carboxyl number of about 50 to about 200 mg KOH/g with a polyester polyol with a hydroxyl number of about 70 to about 300 mg KOH/g and a carboxyl number of, for example, 0 to about 30 mg KOH/g. A person skilled in the art knows how to carry out esterification reactions of this type; for example, these reactions may be performed under the conditions mentioned with regard to the production of polyester polyols, such as, for example, polyester polyols with a hydroxyl number of about 70 to about 300 mg KOH/g and a carboxyl number of, for example, 0 to about 30 mg KOH/g.

Once the esterification reaction between the carboxyl-functional polyurethane resin and the polyester polyol, such as, for example, the polyester polyol with a hydroxyl number of about 70 to about 300 mg KOH/g and a carboxyl number of, for example, 0 to about 30 mg KOH/g is finished, the formed urethanized polyester A1) may, after the addition of a neutralizing agent, be converted, by the addition of water, into an aqueous urethanized polyester dispersion with a solids content of, for example, about 35 to about 55% by weight. It is also possible to provide the urethanized polyester A1), neutralized or non-neutralized, as a solution in water-dilutable organic solvent and to use it in such form to prepare an aqueous coating composition.

The water-borne coating composition of this description further comprises a (meth)acrylic copolymer A2). The water-borne coating composition may also comprise two or more, preferably two, (meth)acrylic copolymers A2) which are different from each other. In principle, there are no particular restrictions as regards the (meth)acrylic copolymer and any (meth)acrylic copolymer is suitable for use in the coating composition of this description. However, it is preferred that the (meth)acrylic copolymer A2) is a hydroxyl-functional (meth)acrylic copolymer. It is further preferred that the (meth)acrylic copolymer A2) is a two-step (meth)acrylic copolymer. The term "two step (meth)acrylic monomer" as used herein means a polymer during the polymerization process of which a first group of monomers is reacted to form an intermediate polymer and a second group of monomers are reacted in the presence of the intermediate polymer to form the two step acrylic monomer.

The (meth)acrylic copolymer A2) may be prepared by the skilled person using any commonly known polymerization method for (meth)acrylic copolymers. Preferably, the (meth) acrylic copolymer A2) is prepared by a skew feed polymerization process with at least two feed streams. Skew feed polymerization as used herein means a multi-step reaction wherein products of previous reaction steps are combined with additional reactants in a sequential fashion to yield the desired copolymer. In a preferred embodiment, the (meth) acrylic copolymer A2) of the coating composition is prepared by a two-step skew feed polymerization process wherein a first group of monomers are reacted to form an intermediate polymer and a second group of monomers are reacted in the presence of the intermediate polymer to form the copolymer used in this description.

The (meth)acrylic copolymer A2) preferably comprises a) about 10-80% by weight, preferably about 20-60% by weight, of at least one reaction product of a monoepoxyester and an unsaturated acid functional monomer, b) about 0-40% by weight, preferably about 10-30% by weight, of at least one hydroxy functional unsaturated monomer which is different from component a), c) about 1-8% by weight, preferably about 2-6% by weight, of at least one unsaturated acid functional monomer and d) about 0-70% by weight, preferably about 20-50% by weight, of at least one other polymerizable unsaturated monomer, wherein the % by weight of components A) and B) and of components a) to d) adds up to 100% by weight and wherein the (meth)acrylate copolymer is preferably prepared by a skew feed polymerization process with at least two feed streams and wherein one feed stream comprises I) about 60-100% by weight of the reaction product of a monoepoxyester and an unsaturated acid functional monomer a), based on the total amount of component a) in the copolymer, II) about 0-60% by weight of the hydroxy functional unsaturated monomer b), based on the total amount of monomer b) in the copolymer, III) about 0-30% by weight of the unsaturated acid functional monomer c) based on the total amount of monomer c) in the copolymer, and IV) about 0-80% by weight of the other polymerizable unsaturated monomers d) based on the total amount of monomers d) in the copolymer, and wherein the remaining one or more feed streams comprise the balance of components a) to d).

The (meth)acrylic copolymer A2) typically has a hydroxy value of about 30-250, an acid value of about 15-50, and a number average molecular weight (Mn) of about 1000-15000, and preferably has a hydroxy value of about 60-150, an acid value of about 5-35, and a number average molecular weight (Mn) of about 1500-6000. The hydroxy functionality of the copolymer is provided by the reaction product of an unsaturated acid functional monomer and a monoepoxyester a) and optionally, by further hydroxy functional unsaturated monomers b). The copolymer may be produced by radical polymerization of the aforementioned components a) to d).

Component a) relates to reaction products of monoepoxyesters and unsaturated acid functional compounds. These monoepoxy esters are preferably glycidyl esters derived from aliphatic saturated monocarboxylic acids with a tertiary or quaternary carbon atom in the alpha position. It is preferred to use glycidyl esters of saturated alpha, alpha-dialkylalkane-monocarboxylic acids with 5 to 13 C atoms in the acid molecule, in particular, preferably, 9 to 11 C atoms in the acid molecule. Examples of glycidyl esters are the glycidyl esters derived from versatic acid and the glycidyl esters derived from pivalic acid. The glycidyl ester derived from versatic acid is particularly preferred. Suitable monoepoxyesters of this type are obtainable commercially, for example, under the name of Cardura®. Examples of unsaturated acid functional compounds are aliphatic unsaturated monocarboxylic acids, such as (meth)acrylic acid, crotonic acid and isocrotonic acid. Maleic acid, fumaric acid and derivatives therefrom can also be used, e.g., reaction products of maleic anhydride with monoalcohols leading to maleic acid half ester-acids. These half ester-acids can also be reacted with the monoepoxyesters. A preferred unsaturated acid functional compound is (meth)acrylic acid. Further possible components a) are reaction products of tertiary fatty acids with up to 12 carbon atoms and epichlorohydrine as well as reaction products of epoxy functional unsaturated monomers, e.g., glycidyl (meth)acrylate, and acids, e.g., aliphatic saturated monocarboxylic acids with a tertiary or quaternary carbon atom in the alpha position.

Particularly preferred components a) are reaction products of glycidyl esters derived from versatic acid and (meth) acrylic acid.

Component a) is a hydroxy-functional polymerizable reaction product and can be formed during the course of production of the (meth)acrylate copolymers.

Component b) relates to hydroxy-functional olefinic unsaturated monomers, which are different from component a). Examples of component b) are hydroxyalkyl esters with primary or secondary hydroxyl groups derived from alpha, beta-olefinic unsaturated monocarboxylic acids. These can include, for example, hydroxyalkyl esters from acrylic acid, methacrylic acid, crotonic acid and/or iso-crotonic acid. Hydroxyalkyl esters derived from (meth)acrylic acid are preferred. The hydroxyalkyl groups can contain, for example, 1 to 10 C atoms, preferably 2 to 6 C atoms. Examples of suitable hydroxyalkyl esters of alpha, beta-olefinic unsaturated monocarboxylic acids with primary hydroxyl groups are hydroxyethyl (meth)acrylate, hydroxypropyl (meth)acrylate, hydroxybutyl (meth)acrylate, hydroxyamyl (meth)acrylate and hydroxyhexyl (meth)acrylate. Examples of suitable hydroxyalkyl esters with secondary hydroxyl groups are 2-hydroxypropyl (meth)acrylate, 2-hydroxybutyl (meth)acrylate and 3-hydroxybutyl (meth)acrylate.

Reaction products from hydroxyalkyl (meth)acylates with lactones can also be used for component b). In this way, at least part of the aforementioned hydroxyalkyl esters of alpha, beta-unsaturated monocarboxylic acids can be modified. The modification results from an esterification reaction taking place by opening the lactone ring. During the reaction, new hydroxyl groups are formed in the final phase in the form of hydroxyalkyl ester groups matching the appropriate lactone. The aforementioned are examples of hydroxyalkyl (meth)acrylates that can be used. Suitable lactones are, for example, those that contain 3 to 15 C atoms in a ring, it is possible for the rings to have different substituents. Preferred lactones are gamma-butyrolactone, delta-valerolactone, epsilon-caprolactone, beta-hydroxy-beta-methyl-delta-valerolactone, lambda-laurinlactone or mixtures thereof. Epsilon-caprolactone is particularly preferred. The reaction products preferred are those of one mol of a hydroxyalkyl ester of an alpha, beta-unsaturated monocarboxylic acid and about 1 to about 5 mol, preferably an average of about 2 mols, of a lactone. Modification of the hydroxyl groups of the hydroxyalkyl esters with the lactone can take place before, during or after carrying out the copolymerization reaction. Component c) relates to radical polymerizable olefinic unsaturated acid functional monomers. Examples of suitable components c) are polymerizable olefinic unsaturated carboxyl-functional monomers, such as olefinic unsaturated mono- and/or dicarboxylic acids, e.g., (meth)acrylic acid, maleic acid, fumaric acid, crotonic acid and isocrotonic acid as well as the corresponding semi-esters and anhydrides of olefinic unsaturated dicarboxylic acids. The acid residue of these carboxylic acids has generally 1 to 8 C atoms. Unsaturated fatty acids with 8 to 22 C atoms can also be used, such as, for example, linolenic acid, linoleic acid, oleic acid or dehydrated castor acid. The use of (meth)acrylic acid is particularly preferred.

Strong acid functional monomers, such as methacryloxy ethyl phosphonic acid, sulfoethyl methacrylate and vinyl phosphonic acid can also be used.

Component d) relates to olefinic unsaturated monomers, which differ from monomers a) to c). It can include olefinic unsaturated monomers that, apart from having at least one olefinic double bond, do not contain any other reactive functional groups. Examples of suitable unsaturated monomers with no other functional groups are esters of unsaturated carboxylic acids with aliphatic monohydric branched or linear as well as cyclic alcohols with 1 to 20 C atoms. Examples of unsaturated carboxylic acids are acrylic acid, methacrylic acid, crotonic acid and isocrotonic acid. Esters of (meth)acrylic acid are preferred. Examples of (meth)acrylic acid esters with aliphatic alcohols are methylacrylate, ethylacrylate, isopropylacrylate, tert.-butylacrylate, n-butylacrylate, isobutylacrylate, 2-ethylhexylacrylate, laurylacrylate, stearylacrylate and appropriate methylacrylates. Examples of (meth)acrylic acid esters with cyclic alcohols are cyclohexylacrylate, trimethylcyclohexylacrylate, 4-tert. butylcyclohexylacrylate, isobornylacrylate, norbornylacrylate and appropriate methacrylates. Examples of (meth)acrylic acid esters with aromatic alcohols are benzyl(meth)acrylates.

Examples of further but not preferred suitable unsaturated monomers without other functional groups are vinyl esters, such as, for example, vinyl acetate, vinyl propionate and vinyl esters derived from branched saturated monocarboxylic acids in alpha position, for example, vinyl esters derived from saturated alpha, alpha' dialkylalkane monocarboxylic acids and vinyl esters derived from saturated alpha-alkylalkane monocarboxylic acids each with 5 to 13 carbon atoms, preferably, 9 to 11 carbon atoms in the molecule.

Small amounts of olefinic polyunsaturated monomers can also be used. These are monomers with at least 2 radically polymerizable double bonds. Examples of these are divinylbenzene, 1,4-butanediol diacrylate, 1,6-hexanediol diacrylate, neopentylglycoldimethacrylate, glycerol dimethacrylate.

Examples of further suitable unsaturated monomers without other functional groups are vinylaromatic monomers, for example, styrene, vinyl toluene and/or tertiary butyl styrene.

Component d) may also include olefinic unsaturated monomers with other functional groups, for example, (meth)acrylamides and their derivatives, (meth)acrylonitriles, silane-functional unsaturated monomers, such as, for example, methacryloxypropyl trialkoxysilanes, vinyl trialkoxysilanes, each with, for example, 1 to 5 carbon atoms in the alkoxy group, acetoacetyl-functional unsaturated monomers, such as, for example, acetoacetoxy ethylmethacrylate, unsaturated monomers containing urea groups, such as, for example, ethylene urea ethyl methacrylate and unsaturated monomers containing amino groups, such as, for example, dialkylamino ethyl (meth)acrylates with, for example, 1 to 5 carbon atoms in the alkyl group and heterocyclic monomers, e.g. vinyl imidazole.

Preferably the (meth)acrylate copolymer comprises as component d) esters of unsaturated carboxylic acids with aliphatic monohydric branched or linear as well as cyclic alcohols with 1 to 20 C atoms and/or vinylaromatic monomers. Preferably the (meth)acrylate copolymer is free of vinyl esters derived from branched saturated monocarboxylic acids in alpha position. When those vinyl esters are contained the copolymer dispersions show insufficient storage stability.

A preferred (meth)acrylate copolymer comprises: a) about 20-60% by weight of at least one a reaction product of a monoepoxyester and (meth)acrylic acid, b) about 10-30% by weight of at least one hydroxyalkyl ester with primary or secondary hydroxyl groups derived from alpha, beta-olefinic unsaturated monocarboxylic acids, c) about 2-6% by weight of at least one an unsaturated acid functional monomer and d) d1) about 10-25% by weight of at least one ester of (meth)acrylic acid with aliphatic monohydric branched or linear as well as cyclic alcohols with 1 to 20 C atoms and d2) about 10-25% by weight of vinylaromatic monomers and d3) optionally other monomers which are different from monomers d1) and d2) wherein the % by weight of components a), b), c), d1), d2) and d3) adds up to 100% by weight.

The (meth)acrylic copolymers contained in the coating compositions are produced by radical copolymerization. Radical polymerization is following the usual method by a person skilled in the art. More specifically, the (meth)acrylic copolymers used in this description are preferably made by first charging a reflux reactor with a monoepoxyester and an organic solvent or solvent blend. The temperature of the reactor contents is typically held between about 60° C. and about 280° C. during polymerization. For example a first feed stream comprising a mixture of a first quantity of unsaturated acid-functional monomer, in an equivalent amount to react with monoepoxyester and build the reaction product of monoepoxyester and unsaturated acid-functional monomer, a hydroxyfunctional monomer, a further unsaturated monomers, and an initiator is charged to the reactor over a period of time. After addition of the first feed stream, the reactor contents are rinsed with additional organic solvent. A second feed stream comprising for example a second quantity of the unsaturated acid-functional monomer, in an amount to provide the copolymer with the desired acid number, further unsaturated monomers, additional organic solvent, and additional initiator is charged to the reactor over a period of time.

The (meth)acrylate copolymers A) is preferably prepared by a skew feed polymerization process with at least two feed streams, preferably with two feed streams. The total amount of unsaturated acid-functional monomer c) and reaction product of monoepoxyester and unsaturated acid-functional monomer a) can be varied between the first and second feed streams, but it is essential that the first feed stream comprises the main quantity, namely about 60-100% by weight of the reaction product of a monoepoxyester and an unsaturated acid functional monomer a), based on the total amount of monomer a) and the lower amount of unsaturated acid functional monomer c), namely, about 0-30% by weight of the unsaturated acid functional monomer c) based on the total amount of monomer c) and optionally other polymerizable compounds b) and d).

The first feed stream comprises for example about 40-80% by weight of the total amount of monomers a) to d) and the second feed stream comprises for example about 20-60% by weight of the total amount of monomers a) to d). After addition of the second feed stream, which comprises the remaining % by weight of each component the reactor contents are typically rinsed with additional organic solvent, held for a period of time at reflux, and rinsed a final time with additional organic solvent. The reactor contents are cooled and then partially or wholly neutralized by the addition of the appropriate amount of a base and converted into an aqueous dispersion by normal or inverse dilution with water. The individual monomers a) to d) are each introduced in such molar amounts that the finished (meth) acrylate copolymer has the hydroxyl and acid numbers defined at the beginning. All usual polymerization initiators for radical copolymerization can be considered, such as aliphatic azo compounds, for example, azobis-isobutyronitrile or azobis-methylbutyronitrile, diazyl peroxides, for example, dibenzoylperoxide, dialkylperoxides, for example, di-tertiary-butylperoxide or di-tertiary-amylperoxide, alkylhydroperoxides, for example, tertiary-butylhydroperoxide or peresters, for example, tertiary-butylperoxybenzoate. Regulators, for example alcohols, such as butanol or mercaptans, such as dodecylmercaptane, can be used to regulate the molar mass.

Suitable organic co-solvents are inter alia water-dilutable monovalent or bivalent alcohols or glycols, for example, ethanol, n-propanol, isopropanol, n-butanol, isobutanol, ethylene glycol, diethylene glycol, triethylene glycol, propylene glycol and glycerol, water-dilutable monoethers derived from polyhydric alcohols, for example methoxypropanol or methoxybutanol, as well as water-dilutable glycol ethers, such as, for example, butylglycol or butyldiglycol.

The water-borne coating composition further comprises a crosslinker B). The cross-linker B) of the aqueous coating composition may comprise conventional cross-linkers known as cross-linkers for coating compositions, for instance cross-linkers for coating compositions containing hydroxyl-functional binders.

Examples of such conventional crosslinkers are any of organic polyisocyanates with aliphatically, cycloaliphatically, araliphatically and/or aromatically bound free isocyanate groups. The polyisocyanates are liquid at room temperature or become liquid through the addition of organic solvents. At 23° C., the polyisocyanates generally have a viscosity of about 1 to about 6,000 mPas, preferably, above about 5 and below about 3,000 mPas.

These polyisocyanates are familiar to the person skilled in the art and can be obtained commercially. The preferred polyisocyanates are polyisocyanates or polyisocyanate mixtures with exclusively aliphatically and/or cycloaliphatically bound isocyanate groups with an average NCO functionality of 1.5 to 5, preferably 2 to 4.

Examples of particularly suitable polyisocyanates are what are known as "paint polyisocyanates" based on hexamethylene diisocyanate (HDI), 1-isocyanato-3,3,5-trimethyl-5-isocyanatomethyl-cyclohexane (IPDI) and/or bis (isocyanatocyclohexyl)-methane and the derivatives known per se, containing biuret, allophanate, urethane and/or isocyanurate groups of these diisocyanates which, following production, are freed from surplus parent diisocyanate, preferably by distillation, with only a residue content of less than about 0.5% by weight. Triisocyanates, such as triisocyanatononan can also be used. Particular preferred crosslinkers are polyisocyanates based on hexamethylene diisocyanate (HDI), 1-isocyanato-3,3,5-trimethyl-5-isocyanatomethyl-cyclohexane (IPDI) and mixtures thereof.

Sterically hindered polyisocyanates are also suitable. Examples of these are 1,1,6,6-tetramethyl-hexamethylene diisocyanate, 1 5-dibutyl-penta-methyldiisocyanate, p- or m-tetramethylxylylene diisocyanate and the appropriate hydrated homologues.

In principle, diisocyanates can be converted by the usual method to higher functional compounds, for example, by trimerization or by reaction with water or polyols, such as, for example, trimethylolpropane or glycerol. The polyisocyanate cross-linking agents can be used individually or mixed.

These are polyisocyanate crosslinking agents commonly used in the paint industry, and are described in detail in the literature and are also obtainable commercially. The polyisocyanates can also be used in the form of isocyanate-modified resins.

Further examples of crosslinkers include aminoplast resins, interesterification crosslinkers and crosslinkers with reversibly blocked isocyanate groups. Examples of aminoplast resins include benzoguanamine resins and, in particular, melamine resins. Examples of interesterification crosslinkers include trisalkoxycarbonylaminotriazines. Examples of crosslinkers with reversibly blocked isocyanate groups include the conventional blocked polyisocyanate crosslinkers also known as crosslinkers for coating compositions.

The aqueous coating composition of this description may also comprise a mixture of at least two crosslinkers as described above. For example, the aqueous coating composition may comprise a mixture of two crosslinkers as described above.

The aqueous coating composition has a solids content, for example, in the range of about 30 to about 65% by weight, preferably about 40 to about 65% by weight. The resin solids content of the aqueous coating composition ranges, for example, from about 20 to about 65% by weight. The resin solids may include about 60 to about 80% by weight of binder solids and about 20 to about 40% by weight of cross-linker solids, the sum of the % by weight equaling 100% by weight.

The binder solids itself may contain at least about 5% by weight, preferably at least about 9% by weight of the urethanized polyester A1) and at least about 40% by weight, preferably at least about 50% by weight, of the (meth)acrylic copolymer A2). Moreover, the binder solids may contain up to about 55% by weight of one or more further binders, i.e. binders that are different from the urethanized polyester A1) and the (meth)acrylic copolymer A2). This concerns hydroxyl-functional binders in particular. Examples of corresponding further binders comprise resins conventionally used as binders for coating compositions, such as, for example, polyester resins, polyurethane resins as well as resin hybrids of two or more of said resin types.

The binder solids itself may include of about 5 to about 60% of the urethanized polyester A1), about 40 to about 95% by weight of the (meth)acrylic copolymer A2) and 0 to about 55% by weight of one or more further, in particular, hydroxyl-functional binders, the sum of the % by weight equaling 100% by weight. In an embodiment, the binder solids include of about 9 to about 50% by weight of the urethanized polyester A1), about 50 to about 91% by weight of the (meth)acrylic copolymer A2) and 0 to about 45% by weight of one or more further, in particular, hydroxyl-functional binders, the sum of the % by weight equaling 100% by weight. In a more preferred embodiment, the binder solids include about 15 to about 35% by weight of the urethanized polyester A1), about 65 to about 85% by weight of the (meth)acrylic copolymer A2) and 0 to about 20% by weight of one or more further, in particular, hydroxyl-functional binders, the sum of the % by weight equaling 100% by weight. In a further embodiment, the binder solids include about 9 to about 50% by weight of the urethanized polyester A1) and about 50 to about 91% by weight of the (meth)acrylic copolymer A2), the sum of the % by weight equaling 100% by weight. In a further more preferred embodiment, the binder solids include about 15 to about 35% by weight of the urethanized polyester A1) and about 65 to about 85% by weight of the (meth)acrylic copolymer A2), the sum of the % by weight equaling 100% by weight.

In the aqueous coating composition of this description, the weight ratio of solids of A1) an urethanized polyester to solids of A2) a (meth)acrylic copolymer may be from 1:10 to 1:1, preferably from 1:8 to 1:2, more preferably from 1:5 to 1:2 even more preferably 1:5 to 1:3.

The aqueous coating composition comprises water in a proportion of, for example, about 20 to about 60 by weight based on the total weight of the aqueous coating composition.

In addition to water, the water-borne coating composition may also contain one or more volatile organic compounds (VOC). However, it is preferred that the water-borne coating composition has a VOC content of not more than about 3.0 lb/gal (359 g/l) (lb/gal=pound per gallon; g/l=gram per liter), preferably of not more than about 2.5 lb/gal (300 g/l), more preferably of not more than about 2.2 lb/gal (264 g/l) and even more preferably of not more than about 2.1 lb/gal (254 g/l). The presence of at least some VOC in the water-borne coating composition of this description is however preferred as VOCs may be used in the thinner which may be used for adjusting the spray viscosity. Hence, for example, the water-borne coating composition comprises at least about 1.7 lb/gal (204 g/l) and more preferably about 1.8 lb/gal (216 g/l) of VOCs. In other words, the water-borne coating composition may have a VOC content of from about 1.7 to about 3.0 lb/gal, preferably from about 1.7 to about 2.5 lb/gal, more preferably from about 1.7 to about 2.2 lb/gal and even more preferably from about 1.8 to about 2.1 lb/gal. The term "volatile organic compound" or "VOC" as used herein comprises any carbon-based solvent which is volatile, for example any carbon-based solvent which has a vapor pressure of at least 0.01 kPa at 293.15 K. In other words, water is not considered to be a "volatile organic compound" or "VOC" as used herein. The VOC content can be calculated using the following equation.

$$VOC = ((\text{volatile weight-\%} - \text{water weight \%}) * \text{density}) / (100 - \text{water volume-\%})$$

wherein "volatile weight-%" is the total % by weight of solvents (including water) in the system, "density" is the density of the coating composition and "water volume-%" is the water % by weight divided by the density of water (0.997 g/ml). The outcome of the formula needs then to be multiplied by 1000 (ml/l) to finally get g/l units.

Volatile organic compounds (VOC) may comprise one or more organic solvents. Examples are C1-C4 alcohols, 2-ethyl hexanol, benzyl alcohol, isodecanol, ethylene glycol, propylene glycol, diethylene glycol, butyl acetate, methyl ethyl ketone, methyl isobutyl ketone, methoxypropanol, butyl glycol, butoxypropanol, butyl diglycol, hexyl glycol, methoxybutanol, diethylene glycol dimethyl ether, dipropylene glycol dimethyl ether, methoxypropyl acetate, butyl glycol acetate, butyl diglycol acetate, ethyl glycol acetate, N-ethylpyrrolidone and aliphatic, aromatic or terpene hydrocarbons.

The aqueous coating composition of this description may comprise fillers and/or pigments, such as, for example, conventional fillers and, optionally, color and/or special-effect pigments are contained; the weight ratio of pigment plus filler/resin solids may then be, for example, 0.6:1 to 1.5:1. Examples of fillers are silicon dioxide, barium sulphate, talcum and kaolin. Examples of inorganic or organic color pigments are titanium dioxide, iron oxide pigments, carbon black, azo pigments, phthalocyanine pigments, quinacridone pigments, pyrrolopyrrole pigments and perylene pigments. Examples of special-effect pigments are metal pigments, e.g. of aluminum, copper or other metals; interference pigments, such as metal oxide-coated metal pigments, e.g. titanium dioxide-coated aluminum, coated micas, such as titanium dioxide-coated mica, platelet-like iron oxide and platelet-like copper phthalocyanine pigments.

The coating compositions can contain usual additives. These additives are additives usually used in the paint industry. Examples of such additives are light stabilizers, for example, based on benzotriazoles and HALS (hindered amine light stabilizer) compounds, flow control agents based on (meth)acrylic homopolymers or silicon oils, rheology-influencing agents, such as highly disperse silicic acid or polymeric urea compounds, thickeners, such as cross-linked polycarboxylic acid or polyurethanes, anti-foaming agents, wetting agents, curing accelerators for the cross-linking reaction of OH-functional binders, for example, organic metallic salts, such as dibutyl tin dilaurate, zinc naphthenate and compounds containing tertiary amino groups, such as triethylamine for the cross-linking reaction with polyisocyanates. The additives are added in the usual amounts familiar to the person skilled in the art, for example, about 0.1 to about 10% by weight, based on the resin solids content of the coating compositions.

Either transparent or pigmented coating compositions can be produced. Since this is a two-component system, the binder components A) containing hydroxyl groups, possibly with pigments, fillers and additives generally used for paint, and the polyisocyanate components B) may only be mixed together shortly before application. In principle, the coatings can still be adjusted to spray viscosity with water and/or organic solvents prior to application. The coating compositions, according to this description, can be applied using known methods, in particular, by spray application. The coating compositions obtained can be cured at room temperature or forced at higher temperatures, for example, up to about 80° C. They can, however, even be cured at higher temperatures of, for example, about 80 to about 160° C. The coating compositions, according to this description, are suitable for automotive and industrial coatings. In the automotive coatings sector, the coatings can be used for both vehicle production line painting and vehicle refinishing applications, such as vehicle part refinishing. Preferred is the use of the coatings in vehicle refinishing applications. For vehicle production line painting stoving (baking) temperatures of about 80 to about 160° C., for example, are used, preferably about 110 to about 140° C. For refinishing curing temperatures of, for example, about 20° C. to about 80° C., in particular, about 40 to about 60° C. are used. The coating compositions can also be used for coating large vehicles and transportation vehicles, such as trucks, busses and railroad cars, where typically curing temperatures of up to about 80° C. are used. The coating compositions according to this description are suited for use as clear coats but can be pigmented with conventional pigments and used as solid-color topcoats, basecoats or undercoats such as primer or sealer. Preferably they can be formulated as transparent clear coats and used in the manufacture of the outer solid-color topcoat layer of a multilayer coating or in the production of the outer clear coat layer of a multilayer coating, in particular in refinishing applications. The present description thus also concerns the use of the coating compositions, according to this description, as topcoat coatings and as clear coatings, preferably as clear coating as well as a method for producing multilayer coatings, the solid-color topcoat and transparent clear coat layers of multilayer coatings, in particular being manufactured from the aqueous coating compositions.

The coating compositions in the form of a solid-color topcoat can be applied, for example, to normal one-component or two-component filler layers. However, the coatings can also be applied and cured as a filler layer, for example, on normal primers, for example, two-component epoxide primers or on electrodeposition primers.

The coating compositions in the form of transparent clear coats can be applied, for example, using the wet-in-wet process on solvent-based or aqueous color and/or effect-giving basecoat layers. In this case, the color and/or effect-giving basecoat layer is applied to a substrate, precoated if necessary, in particular, to precoated vehicle bodies or parts thereof, prior to the application of the clear coat layer from the clear coat according to this description. Following a drying period, if allowed for, both layers are cured together. Thus, for vehicle production line painting, drying can take place, for example, at about 20 to about 80° C. and for refinishing for about 15 to about 45 minutes at room temperature, depending on relative air humidity.

The coating compositions are used to advantage in a multilayer coating to produce solid-color topcoat layers and transparent clear coat layers, preferably transparent clear coat layers. The topcoat and clear coat layers possess good resistance to mechanical and weathering influences and exhibit good chemical resistance.

This description thus further relates to a process which comprises applying a multi-layer coating on a substrate using an aqueous coating composition as described herein and curing the coating. In particular, this description also relates to a process for multi-layer coating of substrates by applying a topcoat layer to a substrate pre-coated with one or more coating layers, wherein the topcoat layer is composed of a color- and/or special effect-imparting base coat coating compound and a clear coat coating compound is applied and wherein the clear coating layer is composed of the aqueous coating composition as described herein. Moreover, this description also relates to a process for multi-layer coating of substrates by applying a topcoat layer to a substrate pre-coated with one or more coating layers, wherein the topcoat layer composed of a pigmented one-layer topcoat coating compound is applied, and wherein the pigmented one-layer topcoat coating layers is composed of an aqueous coating composition as described herein. Preferably, any of these processes is a process for automotive and industrial coating, for instance for coating automotive bodies, automotive body parts, large vehicles and transportation vehicles.

This description will be further described by reference to the following Examples. All parts and percentages are on a weight basis unless otherwise indicated. All molecular weights disclosed herein are determined by GPC (gel permeation chromatography) using a polystyrene standard.

EXAMPLES

Example 1

Preparation of Acrylic Copolymer Dispersion 1 (2 Step Acrylic 1)

In a reactor equipped with a propeller type of stirrer, a thermometer, condenser and monomer/initiator feeding system, 200 grams of Cardura® E10 (CE10) (Glycidylester of C10 versatic acid available from Resolution) and 90 grams of ethoxypropanol (EPR) were loaded and heated to about 150° C. A mixture of 52 grams of 2-Hydroxyethyl methacrylate (HEMA), 160 grams of Styrene (S), 68 grams of acrylic acid (AA), 10 grams of Dicumylperoxide (DCP), 40 grams of CE10 and 40 grams of EPR were added over 2 hours 30 minutes to the reactor while keeping the contents at 150° C. After the feed, the reactor contents were held for 30 minutes. After the 30 minutes hold period, 108 grams of HEMA, 30.4 grams of AA, 141.6 grams of Isobutyl Methacrylate (IBMA), 5 grams of DCP and 45 grams of EPR were added over 2 hours and 30 minutes at about 150° C. followed by a rinsing step for the feed system of 5 grams of EPR. After the rinsing step, the contents of the reactor were held for 2 hours at 150° C. The reactor contents were cooled to 100° C. and 100 parts of EPR were distilled off. In a next step 33 grams of dimethylamino ethanol (DMEA) were added for a theoretical acid value of 20.5, the amount corrected for the measured acid value.

The polymer blend was diluted with 865 grams of water preheated at about 70° C.

Test Results:

| | |
|---|---|
| Solids | 45.1% |
| Viscosity | 3500 cps |
| Acid value | 33.6 mg KOH/g |
| PH | 8.2 |
| Mn | 4500 |
| Mw | 17500 |

Example 2

Preparation of Acrylic Copolymer Dispersion (2 Step Acrylic 2)

In a reactor equipped with a propeller type of stirrer, a thermometer, condenser and monomer/initiator feeding system, 200 grams of CE10 and 40 grams of EPR were loaded and heated to about 150° C. A mixture of 52 grams of HEMA, 160 grams of S, 68 grams of AA, 20 grams of DCP, 40 grams of CE10 and 10 grams of EPR were added over 2 hours 30 minutes to the reactor keeping the contents at 150° C. After the feed, the reactor contents were held for 30 minutes. After the 30 minutes hold period, 108 grams of HEMA, 30.4 grams of AA, 100.8 grams of IBMA, 40 grams of isobornylmethacrylate, 5 grams of DCP and 25 grams of EPR were added over 2 hours and 30 minutes at about 150° C. followed by a rinsing step for the feed system of 5 grams of EPR. After the rinsing step, the contents of the reactor were held for 2 hours at 150° C. Next, the reactor was cooled to 100° C. In a next step, 33 grams of DMEA were added for a theoretical acid value of 29.5, the amount corrected for the measured acid value. In a next step, the polymer blend was diluted with 865 grams of water preheated at about 70° C.
Test Results:

| | |
|---|---|
| Solids | 43.2% |
| Viscosity | 3600 cps |
| Acid value | 10 mg KOH/g |
| pH | 8.3 |
| Mn | 5600 |
| Mw | 39000 |

Example 3

Preparation of a Solution of a Carboxyl-Functional Polyurethane 412.5 g dicyclohexylmethane diisocyanate, 180 g 12-hydroxystearic acid, 180 g dimethylolpropionic acid and 600 g methyl ethyl ketone were introduced into a flask equipped with stirrer, thermometer and reflux condenser. The mixture was heated to 60° C. and stirred for 30 minutes. Thereafter the reaction mixture was heated to 70° C. and stirred for further 30 minutes. Then the reaction mixture was heated to reflux while stirring, until the NCO content was <0.4% by weight. After cooling the contents of the flask were diluted by addition of 127.5 g methyl ethyl ketone.

b) Preparation of a Polyester Polyol 375 g 1,6-hexanediol, 118 g trimethylolpropane, 389 g isophthalic acid and 118 g adipic acid were introduced into a flask equipped with stirrer, thermometer, column and distillation bridge. The contents were condensed while water of condensation was distilled off. The condensation was stopped by cooling to 80° C., after the carboxyl number of the reaction mixture had reached 10 mg KOH/g.

c) Preparation of an Aqueous Dispersion of a Urethanized Polyester Binder 1 (UPB 1)

At 80° C. 451 g of the product of example 3a) were added to the polyester polyol of example 3b) and the reaction mixture was heated to 160° C. while distilling off the methyl ethyl ketone. Esterification was carried out until a carboxyl number of 18 mg KOH/g was achieved. After cooling to 100° C. a 78 g butyl diglycol were added and the contents of the flask were neutralized. To this end 25 g dimethylethanolamine were homogeneously mixed in and the contents of the flask were cooled to 75° C. Deionized water was added portionwise to produce a 42% by weight aqueous urethanized polyester binder dispersion.

Composition Examples 1-7 (CE1-6) and
Comparative Composition Examples 1-4 (CCE1-4)

Preparation and Application of Coating Formulations

In general, clear coat binder solutions were prepared by mixing the aqueous binder dispersions from Example 1, 2 and/or 3c) (see below Table 1) with 0.57% by weight of a conventional commercial flow control agent (BYK® 345), 0.2% by weight of a conventional commercial wetting additive (BYK® 333), 1.03% by weight of a conventional commercial light stabilizer (Tinuvin® 292; HALS product), 1.34% by weight of a conventional commercial light stabilizer (Tinuvin® 1130; UV absorber), the weight-% being based on the total weight of the clear coat binder solution, methoxypropanol, and for CCE4 7% by weight of water.

The amount of the aqueous binder dispersion of Example 1 used was 76.83% by weight in CE1, 63.78% by weight in CE2, 55.59% by weight in CE3 and CE5, 34.59% by weight in CE4, 73.59% by weight in CE6, 38.00% by weight in CE7, 91.91% by weight in CCE1, 96.20% by weight in CCE2, 80.67% by weight in CCE3 and 81.04% by weight in CCE4, the weight-% being based on the total weight of the clear coat binder solution.

The amount of the aqueous binder dispersion of Example 2 used was 17.5% by weight in CE3 and CE5, 38.5% by weight in CE4, and 36.73% by weight in CE7, the weight-% being based on the total weight of the clear coat binder solution.

The amount of the aqueous binder dispersion of Example 3c) used was 19.5% by weight in CE1, 32.5% by weight in CE2, 19.0% by weight in CE3-CE5, 18.50% by weight in CE6, and 12.00% by weight in CE7, the weight-% being based on the total weight of the clear coat binder solution.

The amount of methoxypropanol used was 0.55% by weight in CE1, 0.60% by weight in CE2, 4.76% by weight in CE3-6 and CCE1, 10.53% by weight in CE7, 0.5% by weight in CCE2, 16.00% by weight in CCE3 and 4.2% by weight in CCE4.

In the clear coat binder solution used in CCE4, 4.25% by weight of a linear polyester with an OH-Number of 183 mg KOH/g was added.

A first activator solution was prepared for use in CE1-CE4, CE7 and CCE1-CCE4 by blending 58% by weight of Desmodur®N 3600 (100% solids hexamethylenediisocyanate trimer from Covestro®) with 42% by weight butyl glycol acetate.

A second activator solution was prepared for use in CE5 and CE6 by blending 43% by weight of Desmodur®N 3600 (100% solids hexamethylenediisocyanate trimer from Covestro®), 19% by weight of Desmodur® XP2565 (70% solids isophoronediisocyanate trimer from Covestro®) with 38% by weight butyl glycol acetate.

Clear coat binder solution and activator solution were mixed to obtain an NCO/OH ratio of 1 and viscosity was adjusted to 16-19 sec DIN 4 by water. The thus obtained clear coat coating composition was sprayed on black coated steel panels and baked 30 min at 60° C.

Testing Methods:
Distinctness of Image (DOI)/Wavescan Measurements
Wavescan D.O.I, values of the films have been determined with a micro-wave-scan AW-4824 apparatus from Byk Gardner®.

TABLE 1

| | Composition Examples | | | | | | | Comparative Composition Examples | | | |
|---|---|---|---|---|---|---|---|---|---|---|---|
| | 1 | 2 | 3 | 4 | 5 | 6 | 7 | 1 | 2 | 3 | 4 |
| UPB 1 | 18% | 31% | 18% | 18% | 18% | 18% | 12% | | | | |
| Polyester | | | | | | | | | | | 10% |
| 2 step acrylic 1 | 82% | 69% | 62% | 38% | 62% | 82% | 44% | 100% | 100% | 100% | 90% |
| 2 step acrylic 2 | — | — | 20% | 44% | 20% | — | 44% | | | | |
| Activator | HDI | HDI | HDI | HDI | 26% IPDI/ 74% HDI | 26% IPDI/ 74% HDI | HDI | HDI | HDI | HDI | HDI |
| Ratio of NCO:OH | 1 | 1 | 1 | 1 | 1 | 1 | 1 | 1 | 1 | 1 | 1 |
| VOC | 2.1 | 2.1 | 2.4 | 2.4 | 2.4 | 2.4 | 3 | 2.4 | 2.1 | 2.4 | 2.4 |
| DOI | 93.5 | 92.9 | 91.9 | 92.5 | 93.1 | 93.2 | 94.8 | 91.1 | 94.1 | 92.4 | 91.5 |
| Long wave | 10.5 | 9.7 | 8.8 | 9.0 | 8.9 | 9.5 | 1.8 | 9.6 | 8.3 | 10.2 | 2.9 |
| Short wave | 14.0 | 14.5 | 18.0 | 18.0 | 17.0 | 16.1 | 9.7 | 16.8 | 12.5 | 19.2 | 16.7 |
| Long:short wave | 1.3 | 1.5 | 2.0 | 2.0 | 1.9 | 1.7 | 5.4 | 1.8 | 1.5 | 1.9 | 5.8 |
| Tension | 16.6 | 16.8 | 17.3 | 16.9 | 17.2 | 16.9 | 23.5 | 16.9 | 17.6 | 16.7 | 21.7 |
| Dullness | 4.0 | 4.8 | 4.8 | 4.1 | 3.1 | 2.6 | 1.8 | 4.6 | 2.5 | 4.1 | 6.0 |
| Spraying properties | 7 | 7 | 7 | 7 | 7 | 7 | 6 | 6 | 5 | 7 | 7 |
| Wetting | 7 | 7 | 6 | 6 | 6 | 6 | 7 | 5 | 5 | 7 | 7 |
| Flow | 7 | 7 | 7 | 7 | 7 | 7 | | 6 | 5 | 7 | |
| Rewetting | 7 | 7 | 7 | 7 | 7 | 7 | 6 | 6 | 5 | 7 | 6 |
| Remarks | Film is closed completely after the 1st coat, no more spots where the film won't close; wetting was even better than for CCE3. | Film is closed completely after the 1st coat, no more spots where the film won't close; wetting was even better than for CCE3. | | | | | | | difficult to wet | defect in dry; more haze | |

In Table 1, the content of UPB 1, polyester 2 step acrylic 1 and 2 step acrylic 2 is given in weight-% solids relative to the total binder solids in the respective example.

The evaluation of the obtained coatings is based on the following considerations as regards the physical properties of the coatings as well as the application properties. Concerning distinctness of image (DOI), a higher value is considered better than a lower value. Concerning the ratio of long wave to short wave, a value of around 1:2 is considered to be indicative for a coating which is visually perceived particularly smoothly. Concerning tension, a higher value is considered better than a lower value. Concerning dullness, a lower value is considered better than a higher value. The application properties, i.e. spraying properties, wetting, flow and rewetting have been rated by experienced applicators using a grade scale ranging from 1 (very poor performance, totally unacceptable) to 10 (perfect performance). Although grade 6 is considered to still represent commercial acceptable application properties, these are already somewhat impaired.

As is apparent from Table 1, the aqueous coating compositions, i.e. Composition Examples 1-7 have very desirable physical properties which are also very balanced and, at the same time, also have very desirable application properties. In contrast, the coating compositions of the Comparative Composition Examples 1-4 do not have such desirable balance of optical properties and, further, also do have less favorable application properties than the compositions as described herein, in particular if the VOC content of the comparative compositions is low.

The invention claimed is:
1. A water-borne coating composition comprising
   A) a binder, and
   B) a crosslinker,
wherein the binder comprises A1) a urethanized polyester and A2) a (meth)acrylic copolymer,
wherein the A1) urethanized polyester and the A2) (meth)acrylic copolymer are separate components in the water-borne coating composition, and wherein the (meth)acrylic copolymer A2) comprises
   a) 10-80% by weight of a reaction product of a monoepoxyester and an unsaturated acid functional monomer,
   b) 0-40% by weight of a hydroxy functional unsaturated monomer which is different from component a),
   c) 1-8% by weight of an unsaturated acid functional monomer and
   d) 0-70% by weight of a polymerizable unsaturated monomer that is different than components a), b), and c),
wherein the % by weight of components a) to d) adds up to 100% by weight.

2. The coating composition according to claim 1, wherein the coating composition has a volatile organic compound (VOC) content of not more than about 3.0 lb/gal (359 g/l).

3. A water-borne coating composition comprising
   A) a binder, and
   B) a crosslinker,
wherein the binder comprises A1) a urethanized polyester and A2) a (meth)acrylic copolymer,
wherein a weight ratio of solids of A1) the urethanized polyester and solids of A2) the (meth)acrylic copolymer is from about 1:10 to about 1:1, and wherein the A1) urethanized polyester and the A2) (meth)acrylic copolymer are separate components in the water-borne coating composition.

4. The coating composition according to claim 1, wherein the amount of solids of A1) the urethanized polyester is at least 9% by weight based on the total amount of binder solids of the coating composition and wherein the amount of solids of A2) the (meth)acrylic copolymer is at least 45% by weight, based on the total amount of binder solids of the coating composition.

5. The coating composition according to claim 1, wherein the urethanized polyester A1) has a hydroxyl number of about 50 to about 250 mg KOH/g and a carboxyl number of about 10 to about 50 mg KOH/g.

6. The coating composition according to claim 1, wherein the urethanized polyester A1) is an esterification product made of a polyurethane resin with a carboxyl number of about 50 to about 200 mg KOH/g and a polyester polyol with a hydroxyl number of about 70 to about 300 mg KOH/g.

7. The coating composition according to claim 6, wherein the polyurethane resin is a linear polyurethane resin with terminal carboxyl groups and with terminal and lateral carboxyl groups.

8. The coating composition according to claim 1, wherein the (meth)acrylic copolymer A2) is a two-step (meth)acrylic copolymer.

9. The coating composition according to claim 1,
wherein the (meth)acrylate copolymer is prepared by a skew feed polymerization process with at least two feed streams and
wherein one feed stream comprises
  I) 60-100% by weight of the reaction product of the monoepoxyester and the unsaturated acid functional monomer a), based on a total amount of component a) in the copolymer,
  II) 0-60% by weight of the hydroxy functional unsaturated monomer b), based on a total amount of monomer b) in the copolymer,
  III) 0-30% by weight of the unsaturated acid functional monomer c) based on a total amount of monomer c) in the copolymer, and
  IV) 0-80% by weight of the other polymerizable unsaturated monomers d) based on a total amount of monomers d) in the copolymer, and
wherein the remaining one or more feed streams comprise the balance of components a) to d).

10. The coating composition according to claim 1, wherein the (meth)acrylic copolymer A2) comprises
  a) 20-60% by weight of the reaction product of the monoepoxyester and the unsaturated acid functional monomer,
  b) 10-30% by weight of the hydroxy functional unsaturated monomer which is different from component a),
  c) 2-6% by weight of the unsaturated acid functional monomer and
  d) 20-50% by weight of the polymerizable unsaturated monomers that are different than the components a), b), and c),
wherein the % by weight of components a) to d) adds up to 100% by weight.

11. The coating composition according to claim 10, wherein the (meth)acrylic copolymer A2) comprises
  a) 20-60% by weight of the reaction product of the monoepoxyester and (meth)acrylic acid,
  b) 10-30% by weight of a hydroxyalkyl ester with primary or secondary hydroxyl groups derived from alpha, beta-olefinic unsaturated monocarboxylic acids,
  c) 2-6% by weight of the unsaturated acid functional monomer and
  d) d1) 10-25% by weight of an ester of (meth)acrylic acid with aliphatic monohydric alcohols with 1 to 20 C atoms,
    d2) 10-25% by weight of vinylaromatic monomers and
    d3) optionally other monomers which are different from monomers d1) and d2),
wherein the % by weight of components a), b), c), d1), d2) and d3) add up to 100% by weight.

12. The coating composition according to claim 1, wherein the crosslinker B) is based on hexamethylene diisocyanate (HDI), 1-isocyanato-3,3,5-trimethyl-5-isocyanatomethyl-cyclohexane (IPDI) or mixtures thereof.

13. The coating composition according to claim 1, wherein the coating composition is a clear coat coating composition.

14. The coating composition according to claim 1, wherein the coating composition comprises a volatile organic compound (VOC) content of no more than about 2.5 lbs/gal (300 g/liter).

15. The coating composition according to claim 1, wherein the coating composition comprises a volatile organic compound (VOC) content of no more than about 2.2 lbs/gal (264 g/liter).

16. The coating composition according to claim 1, wherein the coating composition comprises a volatile organic compound (VOC) content of no more than about 2.1 lbs/gal (254 g/liter).

17. The coating composition according to claim 3, wherein the weight ratio of solids of A1) the urethanized polyester and solids of A2) the (meth)acrylic copolymer is from about 1:8 to about 1:2.

18. The coating composition according to claim 3, wherein the weight ratio of solids of A1) the urethanized polyester and solids of A2) the (meth)acrylic copolymer is from about 1:5 to about 1:3.

19. A water-borne coating composition comprising
A) a binder, and
B) a crosslinker,
  wherein the binder comprises A1) a urethanized polyester and A2) a (meth)acrylic copolymer, wherein the A1) urethanized polyester and the A2) (meth)acrylic copolymer are separate components in the water-borne coating composition,
  wherein the polyurethane resin is a linear polyurethane resin comprising terminal carboxyl groups.

20. The coating composition of claim 19, wherein the polyurethane resin comprises terminal and lateral carboxyl groups.

* * * * *